Aug. 14, 1956  E. W. PETERSON  2,758,811
MULTIPLE PILOT CONTROLLED MAIN VALVE
Filed Jan. 9, 1953
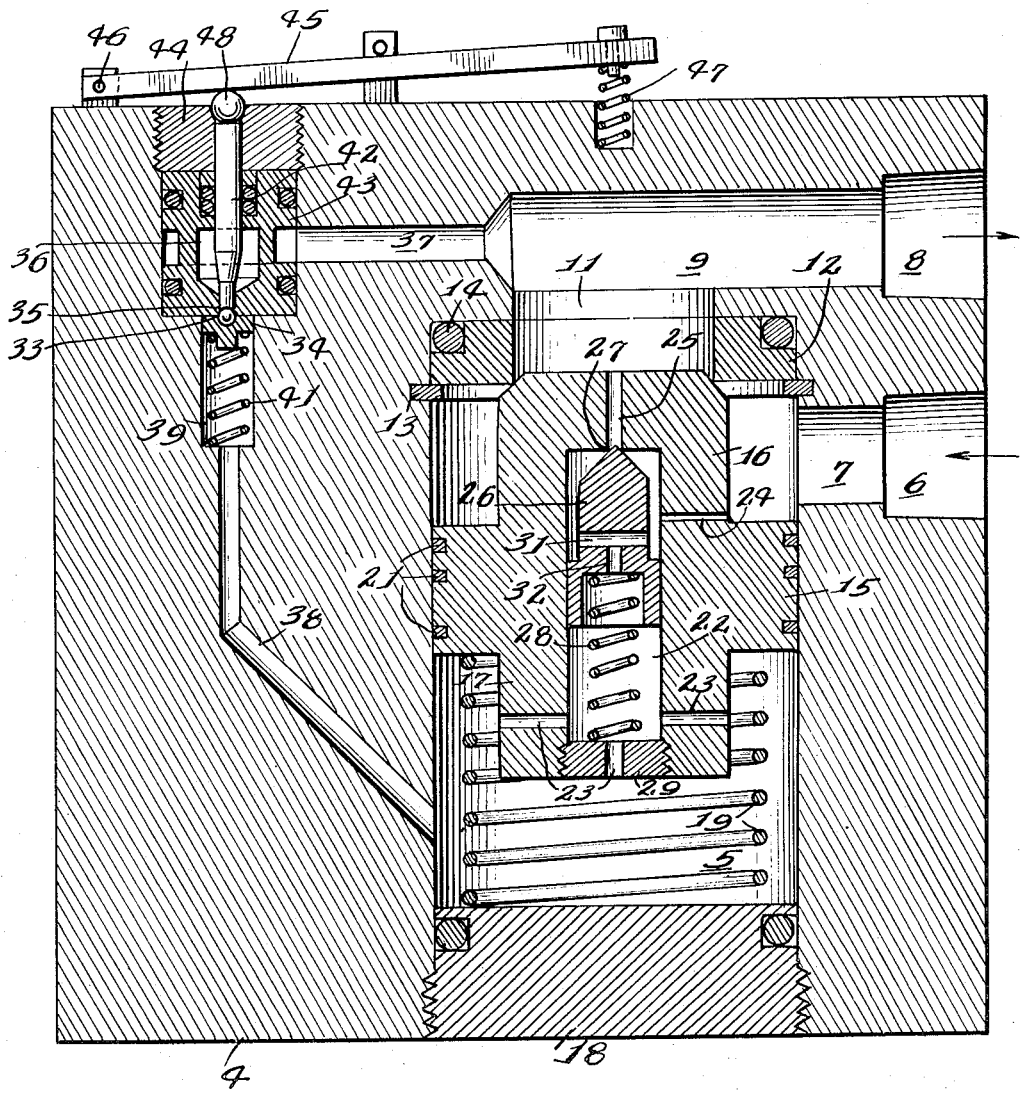
Inventor:
Edwin W. Peterson,
By Wilson & Geppert
Attorneys.

2,758,811

MULTIPLE PILOT CONTROLLED MAIN VALVE

Edwin W. Peterson, Chicago, Ill.

Application January 9, 1953, Serial No. 330,541

1 Claim. (Cl. 251—29)

This invention relates to valves and particularly to reciprocatory valves capable of use on either high or low pressure fluid lines.

Valves of this type when employed on lines carrying several thousand pounds of fluid pressure must of necessity, in order to obviate leakage, seat with, rather than against, the pressure. In addition, the pilot or control valve, in order to be operable against the pressure without the employment of excessive power, must be very small. Within the confines of the foregoing restrictions, it is further essential in many installations that the valve be capable of full opening and complete closing with maximum rapidity.

The primary object of my present invention is the provision of a valve which will for practical commercial purposes satisfactorily meet all of the requirements of operation while conforming to the structural limitations imposed by the aforementioned conditions.

Another object of my invention is to provide a valve which will be simple in construction and capable of being economically produced and which will be efficient, reliable and durable in operation.

More specifically, my novel valve is designed to be leakproof when closed, to be operable upon the exertion of a minimum of force so that it may be actuated by a small electromagnetic control, to fully open with extreme rapidity when actuated, and to move from open to closed position automatically and very quickly.

Other desirable and advantageous features of my invention will become apparent from consideration of the following description and the accompanying drawing of a preferred embodiment thereof selected for illustrative purposes merely and in nowise constituting a limitation upon the scope of my improvement.

The single figure of the drawing is a sectional view exemplifying schematically the principles of my invention embodied in a quick acting valve.

Valve body

Referring now to the structural details shown on the drawing as illustrative of the principles of my invention, reference character 4 indicates generally a valve body which may be formed in any suitable contour or shape and provided with ports, chambers and passages as will more fully appear hereinafter. The valve is shown on the drawing in what will be termed an upright position and for convenience and clarity such words as "upper," "lower," "above," "beneath," and similar terms will be employed notwithstanding the fact that the valve is quite adapted for satisfactory operation in any desired position.

The body is, by boring or otherwise, provided with a cylindrical chamber 5 extending upwardly into the body a substantial distance. An inlet pressure port 6 communicates with said chamber near its upper end through a passage 7 and an outlet or exhaust port 8 communicates with the upper end of said chamber through a passage 9 and a port 11. A replaceable valve seat 12 retained in the upper end of chamber 5 by a retaining ring 13 forms in effect a continuation of the port 11. Suitable packing 14 prevents leakage around the seat.

Main valve

A main valve consisting of the central waist portion shaped to slidingly fit within the chamber 5, the upward extension 16 shaped to close against the seat 12 and the depending extension 17, is disposed within the chamber 5. The valve is introduced into the chamber through the open lower end of the chamber and retained therein by a plug 18 threaded into the body. An expansion spring 19 biases the valve toward its seat and rings 21 are preferably utilized to preclude pressure leakage around the valve.

The main valve is centrally bored to provide therein the longitudinally extending auxiliary valve chamber 22 communicating with main valve chamber 5 below the main valve through one or more passages 23, with the pressure inlet passage 7 through one or more passages 24 and with port 11 and exhaust port 8 through passage 25 in the upper end portion of the main valve.

Auxiliary valve

An auxiliary valve 26 slidably positioned in the chamber 22 is biased to closed position against the seat 27 surrounding the entrance to passage 25 by a light expansion spring 28 interposed between valve 26 and a removable plug 29 closing the lower end of chamber 22. Communication between the upper and lower portions of chamber 22 lying respectively above and beneath the enlarged waist of valve 26 slidingly fitting said chamber is established through intersecting transverse and longitudinal passages 31 and 32, respectively.

Control valve

For the purpose of relieving the pressure below the main and auxiliary valves to permit them to be opened by the fluid pressure, I have provided a control valve the opening of which permits the escape of pressure from below said valves to the exhaust port. This valve consists of a tiny ball 33 resting in a cross-shaped cage 34 and arranged to close a bleed port 35 communicating through a chamber 36 and a passage 37 with the exhaust passage 9. The valve 33 is exposed to the fluid pressure in chamber 5 through a passage 38 opening into the chamber 39 and is further biased toward its seat by an expansion spring 41. A plunger 42 is adapted to unseat valve 33 when said plunger is depressed in its bearing block guide 43 which is held against displacement by a removable plug 44. Due to noncompressibility of the liquid for which the valve is designed and the high pressure to which the liquid is subjected, a slight relief of said pressure through relief port 35 results in an instantaneous withdrawal of valve 26 from its seat 27, thereby further relieving the pressure in chamber 5 below valve 16 causing a retraction of said valve from its seat.

Any suitable easily operable means may be utilized for actuating the relief plunger 42 and in commercial installations electromagnetic apparatus is usually preferable. Merely for illustrative purposes, however, I have here shown a simple mechanical actuator consisting of a manually operable lever 45 fulcrumed at 46 and spring biased to inoperative position by a spring 47. A ball 48 interposed between the lever and the outer end of the plunger transmits the thrust without cramping or binding of the parts.

Operation

With the valve in closed position as illustrated on the drawing, the main valve 16, the auxiliary valve 26 and the tiny control valve 33 are all held against their seats by the fluid pressure entering through the inlet port 6. To open the valve the plunger 42 is depressed by suitable means to unseat the tiny control valve 33 against the pressure exerted thereon. Because of the small size of valve 33 the exertion of only a small amount of force is required to unseat it and relieve the pressure in the system.

The opening of valve 33 reduces the pressure below both main valve 16 and auxiliary valve 26. By reason of the proportioning of the upper and lower pressure receiving surfaces of the two valves and the relative strengths of the springs 19 and 28, the auxiliary valve 26 will be the first to open, thereby instantly and substantially relieving through passage 25 the closing pressure on main valve 15. This valve accordingly very quickly moves to fully open position permitting a free flow of fluid from inlet port 6 through valve port 11 to exhaust port 8.

The prompt opening of the auxiliary valve 26 upon relief of pressure in chamber 5 through control valve 33 is insured by having the aggregate areas of passages 23 exceed the area of passage 32 and by the maintenance through one or more passages 24 of suitable size of the pressure in the chamber surrounding the upper portion of the valve 26 until said valve breaks away from its seat 27.

Upon the closing of control valve 33 the re-establishment of pressure beneath the auxiliary valve seats this valve to close passage 25, whereupon the pressure building up in the lower portion of chamber 5 will quickly return the main valve to seated position, thereby shutting off all flow through the valve.

The size, shape, proportions and arrangement of the various structural features illustrated and described may be varied within wide limits without departing from the principles of my invention as defined in the following claim.

I claim:

A valve, comprising a body having an inlet port and an outlet port, a main valve seat between said ports, a main valve chamber on the inlet port side of said seat, a main valve slidably disposed in said chamber to close against said seat, said main valve being of integral formation shaped to provide a waist intermediate the ends thereof slidably fitting within said main valve chamber, a reduced end providing a seating surface adapted to engage said seat, a reduced end projecting away from said seat and a longitudinally extending central chamber, means maintaining continuous communication between said inlet port and said central chamber, means providing for fluid flow from said central chamber to said outlet port, apertured means carried by said second mentioned reduced end providing for fluid flow from said central chamber to said main valve chamber, an auxiliary valve slidably disposed in said central chamber and adapted to shut off the flow of water from said chamber to said outlet port and having means responsive to fluid pressure from said first mentioned means for opening said auxiliary valve, means providing for the flow of fluid through said auxiliary valve from one end of said central chamber to the other for controlling the position of said auxiliary valve, said first mentioned means being restricted relative to said second and said last mentioned means, a spring disposed in said main valve chamber for biasing said main valve to closed position, a spring disposed in said central chamber of said main valve for biasing said auxiliary valve to closed position, an exhaust passage from said main valve chamber having a valve seat therein, an inwardly opening control valve positioned in said exhaust passage to be urged against its seat by the fluid pressure exerted upon said main and auxiliary valves in a closing direction, and means for unseating said control valve.

References Cited in the file of this patent

UNITED STATES PATENTS

| | | |
|---|---|---|
| 922,686 | Fernald | May 25, 1909 |
| 1,209,753 | Phillips | Dec. 26, 1916 |
| 1,229,726 | Ebeling | June 12, 1917 |
| 1,637,825 | Klann | Aug. 2, 1927 |
| 1,767,037 | Anderson | June 24, 1930 |
| 2,274,663 | Brisbane | Mar. 3, 1942 |
| 2,295,871 | Sloan | Sept. 15, 1942 |
| 2,591,299 | Rowand | Apr. 1, 1952 |